(12) United States Patent
Borshukov

(10) Patent No.: US 7,079,137 B2
(45) Date of Patent: Jul. 18, 2006

(54) METHOD FOR DIGITALLY RENDERING AN OBJECT USING MEASURED BRDF DATA

(75) Inventor: George Borshukov, San Francisco, CA (US)

(73) Assignee: Warner Bros. Entertainment Inc., Burbank, CA (US)

(*) Notice: Subject to any disclaimer, the term of this patent is extended or adjusted under 35 U.S.C. 154(b) by 415 days.

(21) Appl. No.: 10/715,870

(22) Filed: Nov. 17, 2003

(65) Prior Publication Data

US 2004/0150643 A1  Aug. 5, 2004

Related U.S. Application Data

(60) Provisional application No. 60/426,560, filed on Nov. 15, 2002.

(51) Int. Cl.
*G06T 15/50* (2006.01)

(52) U.S. Cl. .................. 345/426; 345/419; 345/421

(58) Field of Classification Search ................ None
See application file for complete search history.

(56) References Cited

U.S. PATENT DOCUMENTS

| | | | |
|---|---|---|---|
| 4,645,459 A * | 2/1987 | Graf et al. ................ 434/43 |
| 5,499,306 A | 3/1996 | Sasaki et al. | |
| 5,745,759 A * | 4/1998 | Hayden et al. ............ 719/318 |
| 5,974,168 A | 10/1999 | Rushmeier et al. | |
| 6,044,180 A | 3/2000 | Brandestini et al. | |
| 6,097,394 A * | 8/2000 | Levoy et al. ............. 345/419 |
| 6,124,864 A | 9/2000 | Madden et al. | |
| 6,148,113 A | 11/2000 | Wolverton et al. | |
| 6,160,907 A | 12/2000 | Robotham et al. | |
| 6,166,744 A | 12/2000 | Jaszlics et al. | |
| 6,362,822 B1 | 3/2002 | Randel | |
| 6,519,360 B1 | 2/2003 | Tanaka | |
| 6,538,396 B1 | 3/2003 | Vlahos et al. | |
| 6,552,731 B1 | 4/2003 | Gonsalves | |
| 6,564,108 B1 | 5/2003 | Makar et al. | |
| 6,571,024 B1 | 5/2003 | Sawhney et al. | |
| 6,628,298 B1 | 9/2003 | Debevec | |
| 6,628,830 B1 | 9/2003 | Yamazoe et al. | |
| 6,657,637 B1 | 12/2003 | Inagaki et al. | |
| 6,694,064 B1 * | 2/2004 | Benkelman ............... 382/284 |
| 6,750,873 B1 * | 6/2004 | Bernardini et al. ........ 345/582 |
| 6,765,573 B1 * | 7/2004 | Kouadio .................. 345/426 |
| 6,810,130 B1 * | 10/2004 | Aubert et al. ............. 382/100 |
| 2002/0186314 A1 | 12/2002 | Debevec | |

(Continued)

OTHER PUBLICATIONS

Article "Monte Carlo Methods and the Challenge of Photo-Realism in Computer Graphics" by Steven Collins (Image Synthesis Group, Trinity College Dublin), pp. 1-21, Proceedings of the 1998 Hitachi Symposium, 1998.*

(Continued)

*Primary Examiner*—Richard Hjerpe
*Assistant Examiner*—Enrique L. Santiago
(74) *Attorney, Agent, or Firm*—O'Melveny & Myers LLP

(57) ABSTRACT

A digital rendering method employs measured BRDF values for a modeled material by collecting BRDF measurements using a precision reflectometer. A laser light may be used as the source of the incident beam. Sparsely measured BRDF data is resampled to build a data table of BRDF values over a dense regular grid. The data table may be supplied as input to a ray-tracing shader, and the shader may calculate BRDF values for modeled light rays by interpolating between adjacent grid points for the data table.

17 Claims, 2 Drawing Sheets

U.S. PATENT DOCUMENTS

| | | | |
|---|---|---|---|
| 2003/0011596 A1* | 1/2003 | Zhang et al. | 345/426 |
| 2003/0012448 A1 | 1/2003 | Kimmel et al. | |
| 2003/0030639 A1* | 2/2003 | Ritter | 345/426 |
| 2003/0103057 A1 | 6/2003 | Graves et al. | |
| 2003/0202120 A1 | 10/2003 | Mack | |
| 2003/0227457 A1* | 12/2003 | Pharr et al. | 345/426 |
| 2003/0234786 A1* | 12/2003 | Cole et al. | 345/426 |
| 2004/0061700 A1* | 4/2004 | Shioya | 345/426 |
| 2004/0100465 A1* | 5/2004 | Stowe et al. | 345/427 |
| 2005/0140673 A1* | 6/2005 | Guo et al. | 345/426 |

OTHER PUBLICATIONS

Article "Statistical Approaches to Material Classification", by Manik Varma and Andrew Zisserman, pp. 1-6, Proceedings of the Indian Conference on Computer Vision 2002.*

Article "Illumination and Reflection Maps: Simulated Objects in Simulated and Real Environments" by Gene S. Miller and C. Robert Hoffman, pp. 1-12, Course Notes for Advanced Computer Graphics, SIGGRAPH 84, Jul. 23, 1984.*

Article "Measuring and Modeling Anisotropic Reflection" by Gregory J. Ward, International Conference on Computer Graphics and Interactive Techniques Proceedings of the 19th annual conference on Computer graphics and interactive techniques, pp. 265-272, 1992, ISSN:0097-8930.*

Article "Adaptive Radiosity Textures for Bidirectional Ray Tracing" by Paul S. Heckbert, pp. 145-154, Computer Graphics, vol. 24, No. 4, Aug. 1990.*

Article "Generalization of Lambert's Reflectance Model" by Michael Oren and Shree K. Nayar, Department of Computer Science, Columbia University New York, pp. 1-15, New York Association for Computing, 1994.*

Article "Reflectance and Texture of Real-World Surfaces" by Kristin J. Dana, Bram van Ginneken, Shree K. Nayar, Jan. J. Koenderink, pp. 1-34, ACM Transactions on Graphics, vol. 18, No. 1, Jan. 1999.*

Spectral Reflectance, BRDF, Hyperspectral Imaging, Thermal Coatings, FTirs etc. Surface Optics Corporation; pp. 1-7; www.surfaceoptics.com.

"A Survey of BRDF Representation for Computer Graphics" by Szymon Rusinkiewicz, CS348, Winter 1997; pp. 1-14); www.cs.princeton.edu/smr/cs348c-97/surveypaper.html.

"An Architecture for Accelerated Anisotropic Shading" by Stephen Ehmann, Thesis Submitted for B.S. Degree at University of Toronto; Supervisor, M. Van De Panne, Apr. 1998 Division of Engineering Science.

"A Data-Driven Reflectance Model" by Wojciech Matusik et al.

"Acquiring Parameters for Rendering" by Zack Waters, Realistic Raytracing; pp. 1-11; www.cs.wpi.edu/emmanuel/courses/cs563/write_ups/zackw_measurement.

* cited by examiner

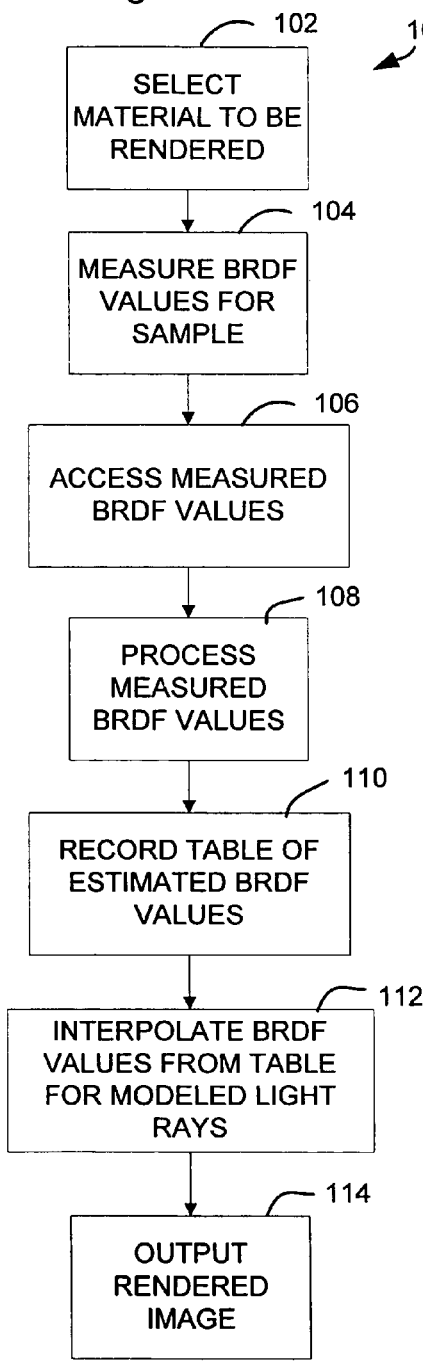
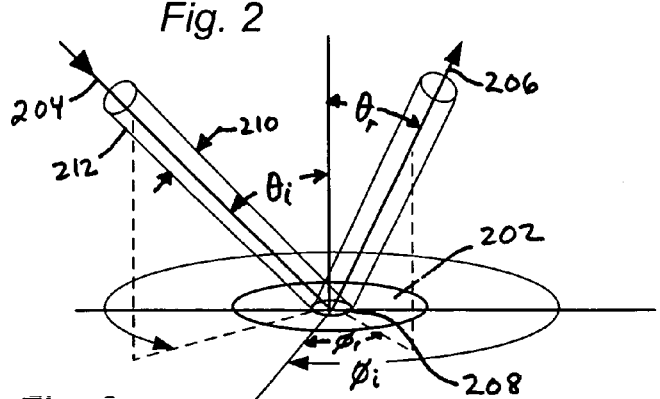
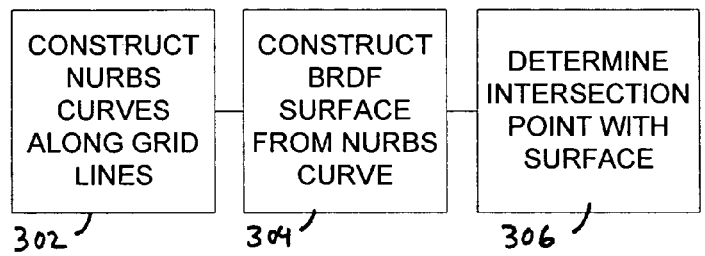
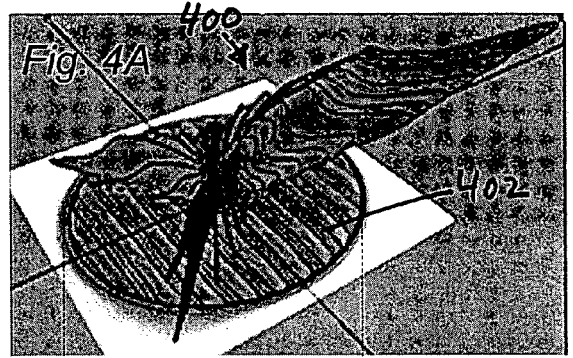
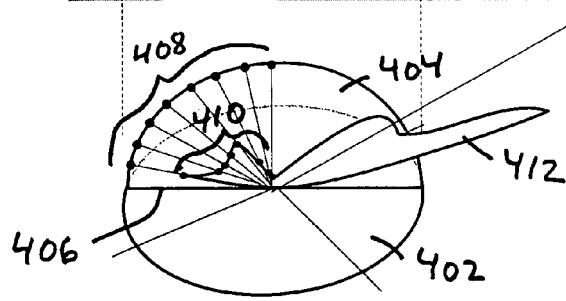

Fig. 5A
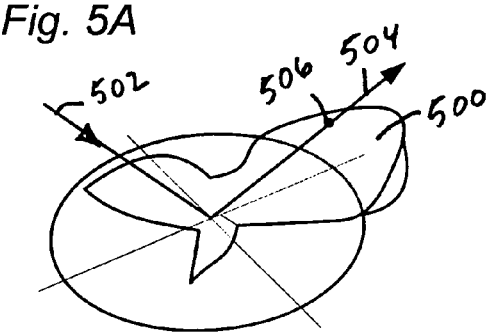
Fig. 5B
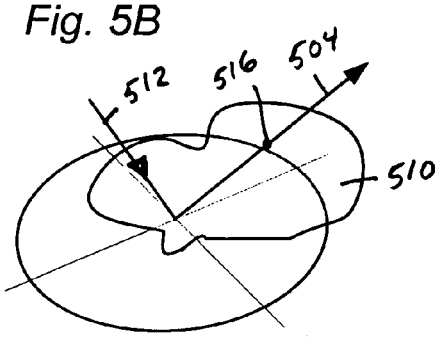
Fig. 6
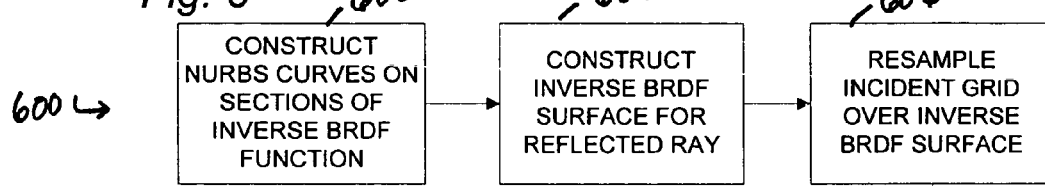
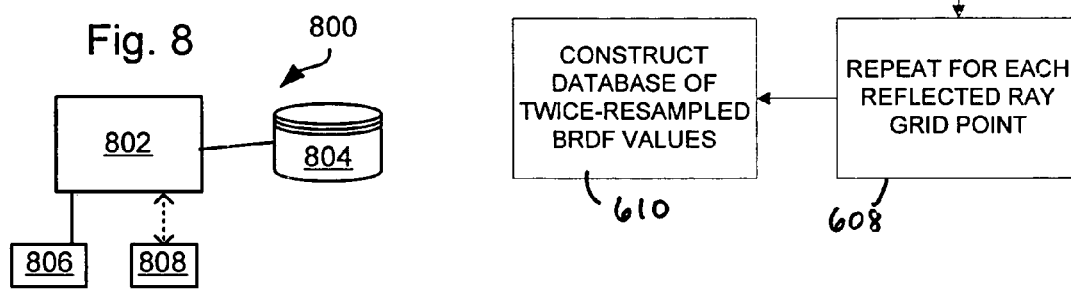
Fig. 8
Fig. 7
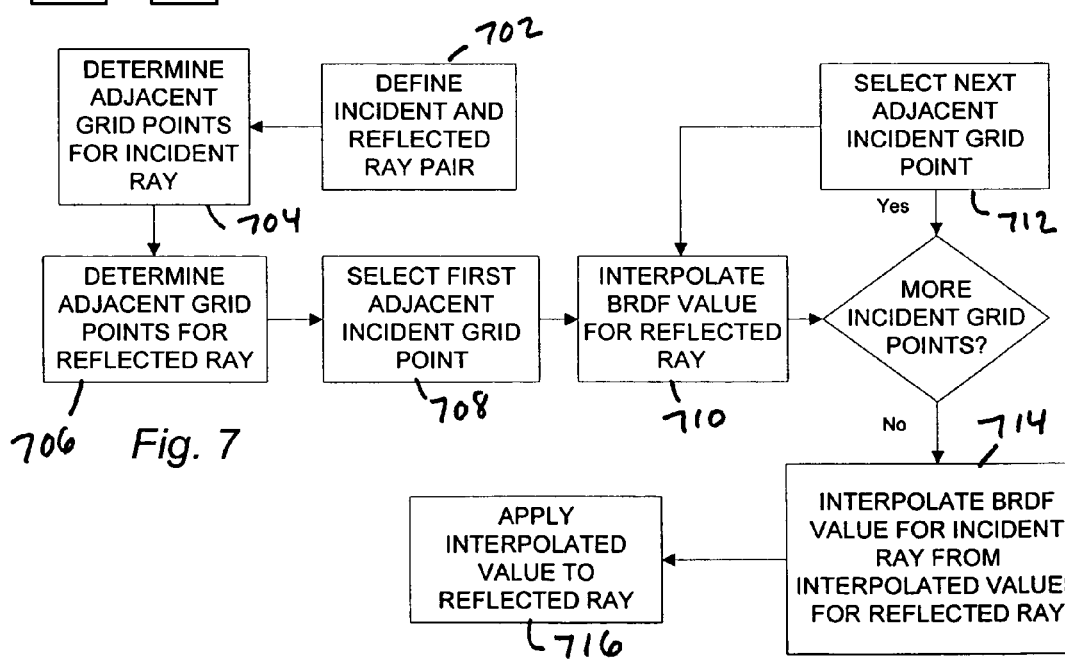

METHOD FOR DIGITALLY RENDERING AN OBJECT USING MEASURED BRDF DATA

CROSS-REFERENCE TO RELATED APPLICATION

This application claims priority pursuant to 35 U.S.C. § 119(e) to U.S. Provisional Application No. 60/426,560, filed Nov. 15, 2002, which application is specifically incorporated herein, in its entirety, by reference.

BACKGROUND OF THE INVENTION

1. Field of the Invention

The present invention relates to methods in the field of digital imaging, and more particularly, to methods for computer-assisted shading and rendering of three-dimensional surfaces.

2. Description of Related Art

A core aspect of computer-assisted rendering involves calculating reflected light rays resulting from a defined modeled light source, based on the surface geometry of an object to be rendered, and the reflectance properties of its surface such as may be caused by surface properties at a microscopic scale. Traditionally, fairly simple theoretical models, such as the Phong model, have been used to model microscopic reflectance properties. But many common materials, such as fabrics, cannot be rendered in a photo-realistic way using simplified models.

A more sophisticated approach to modeling reflectance properties entails the use a function that defines reflectance as a function of the angle of incidence and angle of reflectance. This function is usually referred to as the Bidirectional Reflectance Distribution Function (BRDF), which may be expressed as $$\rho(\theta_i, \phi_i, \theta_r, \phi_r) = \frac{\partial L_r(\theta_r, \phi_r)}{\partial E_i(\theta_i, \phi_i)}, \quad \text{(Eq. 1)}$$

where E is the irradiance (incident flux) and L is the reflected radiance (reflected flux). The angle of incidence is defined by $\theta_i, \phi_i$, and the angle of reflectance by $\theta_r, \phi_r$. The symbols θ and ϕ here represent angular coordinates, for example, as used in a polar coordinate system. The BRDF may be generally described as a function that defines the light that will be reflected in every direction from a surface, for each incident ray angle. The BRDF ratio $\rho(\theta_i,\phi_i,\theta_r,\phi_r)$ for a defined pair of incident and reflected rays is referred to herein as a "BRDF value." Materials that exhibit anisotropic reflectance, such as fabrics, are difficult to model theoretically. Sufficiently accurate theoretical models generally are not capable of sufficiently photo-realistic rendering in demanding environments, such as motion-picture production, particularly for applications that require seamless compositing of digitally rendered and photographic images.

As an alternative to modeling a surface's BRDF, a sample of actual material may be measured using a measuring apparatus. Various measuring apparatus are known in the art, including physical gonioreflectometers and imaging gonioreflectometers. For rendering applications, using measured BRDF data is subject to several limitations. For one, traditional measurement apparatus often does not yield reliable or reproducible BRDF measurements. Thus, the final rendered result may differ noticeably from a photographic image of the same material. One of the reasons for photo-realistic rendering is to provide digitally rendered images that can be seamlessly inserted into photographic images, for the purpose of creating digital special effects. Inaccurate rendering of a material, such as may be caused by insufficiently precise measurement of the material's BRDF, will inevitably frustrate this purpose.

Second, even if sufficiently accurate BRDF data can be gathered using a carefully designed reflectometer, the data will only be sampled over a discrete number of points of a sample surface. Because the collection of BRDF data for each point of the sample surface is inherently time-consuming, available BRDF data for a given material tends to comprise a sparsely-sampled data set. Merely interpolating between sparsely-sampled data points may not provide a sufficiently accurate model of the actual BRDF to achieve a photo-realistic result.

These limitations have hindered the application of photo-realistic rendering, particularly for demanding production environments such as motion picture production. It is desirable, therefore, to provide a method for overcoming them.

SUMMARY OF THE INVENTION

The present invention provides methods for photo-realistic rendering using measured BRDF data, that overcomes the limitations of the prior art. The method has proven capable of providing photo-realistic digital images in a motion picture production environment. Images rendered according to the invention were virtually indistinguishable from photographic images of the same material, even when incorporating previously difficult-to-render anisotropic materials such as fabric. It should be appreciated, however, that photo-realistic results may not be obtained for every conceivable material using BRDF sampling and rendering according to the invention. Some materials may be less amenable to this technique. Such materials may include, for example, living tissue, which is both extremely difficult or impossible to sample effectively, and may exhibit scattering and transmissive properties that are not adequately accounted for in the BRDF model.

In an embodiment of the invention, the reflectance properties of materials are measured for use in digital rendering, characterized in terms of BRDF. The BRDF properties of desired materials are measured using a precision reflectometer with incident radiation from a laser source. Data may be sampled over a sparse selection of points that are not on a regular grid. Sample BRDF data may then be processed to remove outliers and resampled on a regular grid.

Resampling may be accomplished by first constructing NURBS curves along the constant-azimuth raw samples. These curves may then be used to generate NURBS surfaces. A virtual ray may then be directed from the sample origin at various values of θ and ϕ comprising a regular grid. The intersection of the reflected ray with the constructed NURBS surface may be used to define the value of the BRDF for the given θ, ϕ of the incoming ray at the grid point of the reflected ray. This process may be repeated to define the BRDF for reflected rays over regular grid points, for each incident ray sample point. The result will comprise an array or set of tables, each defining the reflected BRDF for a given incident angle over a regular grid. If the incident rays are collected over a sufficiently dense regular grid, then no further processing may be needed. In the alternative, a similar process may be used to resample the BRDF data over a regular and/or denser grid of incoming rays, by constructing NURBS curves for each reflected grid point over constant-azimuth values of incident radiation for a given reflected ray, constructing an incident-ray NURBS surface from the NURBS curves, and determining the corresponding BRDF value over a regular grid of incident rays from the intersection with the NURBS surface.

The grid-sampled BRDF data may then be interpolated, such as by using fast quadrilinear interpolation lookup to generate BRDF values for arbitrary angles during a shading process. BRDF-rendered objects may be incorporated into scenes developed using an image-based lighting process, as further described in the copending application titled "REALITY-BASED LIGHT ENVIRONMENT FOR DIGITAL IMAGING IN MOTION PICTURES," filed Nov. 17, 2003. Resulting digital images may be virtually indistinguishable from photographic images in the same frame, thereby opening up a new realm of possibilities for digital manipulation of real-life objects.

A more complete understanding of the methods according to the present invention will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1 is a flow chart showing exemplary steps for according to an embodiment of the invention.

FIG. 2 is a diagram showing geometry useful for describing BRDF.

FIG. 3 is a flow chart showing exemplary steps for determining BRDF values over a resampled grid.

FIG. 4A is a perspective diagram illustrating BRDF measurement data from a sampling grid for a fixed incident ray.

FIG. 4B is a diagram showing geometry associated with constructing a curve using measured BRDF values over a section of a sampling grid.

FIGS. 5A and 5B are perspective diagrams showing exemplary BRDF surfaces for different incident rays.

FIG. 6 is a flow chart showing exemplary steps for resampling BRDF measurement data to provide BRDF values over a denser and/or more regular grid of incident rays.

FIG. 7 is a flow chart showing exemplary steps for interpolating resampled BRDF data during a shading process.

FIG. 8 is a block diagram showing an exemplary system for carrying out steps of a method according to the invention.

DETAILED DESCRIPTION OF THE PREFERRED EMBODIMENTS

The present invention provides a method and system for digitally rendering an object using measured BRDF data, that overcomes the limitations of the prior art. In the detailed description than follows, like element numerals are used to denote like elements appearing in one or more of the figures.

Exemplary steps of a method 100 for rendering an object using measured BRDF data are shown in FIG. 1. Initially, at step 102, a material to be rendered may be selected. Suitable materials may include, for example, fabrics of all types, foliage, stone and ceramic materials, brushed or textured metals, oxidized materials, powdery, dusty or dirty surfaces, and most other materials that are difficult to render using theoretical reflectance models. The material should present a surface with reflectance properties that are sufficiently stable for measurement.

At step 104, BRDF values are gathered for the material over a grid of incident and reflected beam positions, such as by using a physical gonioreflectometer. Such measurement devices usually mount the sample on a flat rotating stage, and include a movable mount for an incident beam source and a separate movable mount for a reflected beam detector. The general characteristics of such measurement reflectometers are known, but reflectometers as used for computer graphics applications have generally not been suitably equipped. Suitable equipment should include very precise and accurate mounts for positioning the light source and detector, a sensitive and well-characterized light detector, and a light source that is also very well characterized and controlled, such as a laser source with precision optics for controlling beam parameters. The reflectometer should also be capable of automatically and rapidly making a large number of BRDF measurements of a material sample.

Suitable machines for measuring BRDF may be available from Surface Optics Corporation of San Diego, Calif.; or from other suppliers. For example, Surface Optics SOC 200 Bidirectional Reflectometer comprises a suitable machine. Such machines have traditionally been used for engineering applications that required precise knowledge about the BRDF properties of materials, such as in aerospace, military, and optics fields. They may also prove useful for rendering purposes. Using such a machine, it is feasible to accurately measure the BRDF properties of a large number of materials, which may then be input into a BRDF database for rendering purposes. Previously, measurements of BRDF have been considered too unreliable to be useful, but photo-realistic results have been achieved by using BRDF's measured and applied as described herein.

Advantageously, a laser source is used for the incident beam. A laser beam may be very well characterized as to wavelength and beam geometry. For example, a laser may be used to provide a collimated beam 212 that more closely approximates a theoretical incident ray 204, as shown in FIG. 2. In a reflectometer of this type, a sample 202 may be mounted on platform in a defined coordinate space, indicated in FIG. 2 by the x, y, and z axes. Conceptually, a given BRDF value represents a ratio between an intensity of an incident ray 204 and a reflected ray 206, integrated over an infinitesimal solid angle. Each incident ray 204 is characterized by a pair of angular positions $\theta_i$, $\phi_i$, and each reflected ray is characterized by $\theta_r$, $\phi_r$. The BRDF function is a four-dimensional function of these parameters.

A theoretical BRDF ray occupies a solid angle of an infinitesimal size, and converges to a point at the sample surface. But an actual physical beam must occupy a spot 208 of finite size at the material surface. In addition, if spot 208 is too small, the reflectance of the sample is determined by local microscopic sample geometry under the spot. This geometry may be highly variable, resulting in BRDF measurements that are not indicative of the macroscopic surface reflectance properties that are needed for most digital rendering. At the same time, the spot 208 size should be small enough to define the parameters $\theta_i$, $\phi_i$ with adequate precision. An optimal spot size should generally be the minimum size needed to encompass a representative area of the surface micro-geometry. This, in turn, will depend on the scale at which the material surface is patterned. For example, an optimal spot size for a tightly-woven fabric sample will be smaller than for a loosely-woven sample.

The spot geometry and intensity profile should also be well defined. Advantageously, a laser beam can be reliably characterized as to its diameter 210 and intensity profile, so that the spot is well characterized. In addition, a laser beam is easily controlled to a range of diameters, so as to provide optimal spot sizes for a variety of sample materials.

Using a suitable BRDF measuring device, measurements may proceed over a regular grid of incident and reflected rays. For each incident grid position, reflectance measurements may be made over a grid. For example, if the incident grid contains 100 nodes, and 100 reflectance measurements are made for each incident node, a total of 10,000 ($100^2$) BRDF values will be measured. Practical constraints limit the number of nodes that can be sampled, resulting in measurement grids that may be too sparsely populated to support accurate interpolation at render time. In addition, with a very large number of measurement samples, some measurements may be outliers that are either grossly inaccurate, or otherwise not useful for rendering purposes. These problems may be addressed by processing the data prior to rendering. Therefore, measurement data for a sample may be recorded for later processing, such as by using a computer database.

Referring again to FIG. 1, at step 106, a set of measurement BRDF data may be accessed for processing. Methods for accessing data using a computer system are known in the art, and any suitable method may be used. The accessed data should be collected and configured as described above. At step 108, a set of measurements may be processed to provide a table of estimated BRDF values that are sample over a denser and/or more regular grid than the actual measured values. The denser and/or more regular grid may be more suitable for use in interpolating BRDF values for use in rendering. In addition, processing may be used to remove outliers in the data. Further details regarding processing of measured data are described below, in connection with FIGS. 3–6. Once the measured data has been processed to provide table of BRDF values over the desired grid, the processed table may be stored as indicated at step 110. Advantageously, the table of estimated BRDF values may be stored in a form usable as input to a shading process based on ray-tracing.

At step 112, a suitable material shading algorithm may access the resampled BRDF data recorded at step 110, and interpolate reflected flux as a function of incident angle, reflected angle, incident ray intensity, and a BRDF value interpolated from the resampled BRDF data table for the rendered material. A typical double-interpolation method is described below in connection with FIG. 7. Detailed algorithms for carrying out interpolation, for example, fast quadrilinear interpolation, are well known in the art. Any suitable interpolation method may be used. The shader may be designed to draw upon a library of resampled BRDF data, and therefore may support realistic rendering of any suitable material in the library.

For example, surfaces within a scene to be rendered may be assigned a material identification corresponding to a material in a library of BRDF-measured materials. Every surface in the scene, or less than every surface in the scene, may be assigned a material value corresponding to a material in the BRDF library. For example, only surfaces at the focal point of a scene may be selected. Surfaces that are not assigned may be rendered in any other desired way. The scene may then be rendered using any suitable ray-tracing method, as indicated at step 114. In an embodiment of the invention, ray-tracing tools supplied by Mental Ray™ (www.mentalray.com) were used to produce final rendering, using a shading tool that was customized to receive the resampled BRDF data tables as input, and to perform a fast quadrilinear interpolation between adjacent data points of the sampling grid.

Further details of an exemplary processing step 108 are provided below. In brief, a suitable processing method 300 as shown in FIG. 3 makes use of commonly-available tools for manipulating three-dimensional data. In an initial step 302, a three-dimensional curve is fitted to BRDF values over a convenient grid section, such as over a constant-azimuth grid line. Prior to curve-fitting, outlying measurements may be removed. In an embodiment of the invention, a Non-Uniform Rational B-Spline (NURBS) curve may be constructed by connecting the measured BRDF values along a grid line. Curve-fitting to a NURBS may be implemented using commonly-available tools used in digital rendering, for example, Maya™. Other curve-fitting methods may also be suitable, and may be used in the alternative to a NURBS curve. Curves may similarly be constructed for each section, for example, constant-azimuth grid line, of a sampling grid.

The related curves may then be connected to define a NURBS surface, in step 304. The resulting three-dimensional surface may resemble a chart of the underlying measurement data as shown in FIG. 4A, but differs in defining a continuous surface over the sampling space, representing the measured BRDF data. At step 306, the NURBS surface may be used to generated a resampled data table along any desired grid of $\theta_r$, $\phi_r$. The resampled grid will generally be more dense and/or more regular that the measured sampling grid. For each value of $\theta_r$, $\phi_r$ in the grid, an intersection between an outgoing ray and the NURBS surface may be calculated. The resampled BRDF value for that grid point is the BRDF value for the intersection point. For example, if the NURBS surface is defined in polar coordinates, the resampled BRDF value may be equated or scaled from the polar coordinate "r" of the intersection point.

FIGS. 4A–5B may help to illustrate the steps of method 300. FIG. 4A shows a polar-coordinate, three-dimensional graph 400 of BRDF measurement data from a sampling grid for a fixed incident ray. A diagram of the sample 402 appears beneath the graph, along with a pair of coordinate axes for the sample plane. The BRDF value associated with a particular reflected ray is graphed as a point (r, $\theta$, $\phi$) in polar coordinates, wherein the "r" is the BRDF value and the polar angle coordinates ($\theta$, $\phi$) are those of the reflected ray. Polar graphs as shown in FIG. 4A are a standard way of visualizing BRDF data, and the particular graph shown was produced by commercially-available software for the SOC 200 reflectometer. Although this visualization has no use in rendering, it may be helpful for understanding a method for processing BRDF measurement data according to the invention.

In particular, FIG. 4A shows that a set of measured BRDF values may be thought of as comprising a three-dimensional surface in a reflected ray space. Thus, a BRDF "surface" may be "sliced" over a section of a sampling grid to yield a curve. FIG. 4B shows a hypothetical slice of BRDF measurement data, taken along a vertical plane 404 through a constant-azimuth grid line 406. Nodes 408 represent sampling points along the azimuth. For illustrative simplicity, sampling points are not shown on the right half of the figure. For each of these sampling locations, an associated point 410 may be plotted on the slicing plane. Again, plotted points 410 are not shown on the right side of the figure for illustrative clarity. The "r" coordinate of the plotted point corresponds to the measured BRDF value. A curve, such as a NURBS curve may then be constructed through the plotted points, as known in the art.

When a family of such NURBS curves for BRDF measurements taken for a given incident ray 502 are combined, a NURBS surface 500, such as shown in FIG. 5A, may be constructed. Any reflected ray from the coordinate origin, for example, ray 504, will intersect this curve at a point 506. Thus, the surface may be resampled over any desired grid, with BRDF values for the re-sampling grid estimated from the corresponding "r" coordinate of the intersection point.

A family of such NURBS curves and corresponding resampled BRFD data tables may be constructed for each sample, each corresponding to an incident beam angle of the reflectometer. For example, FIG. 5B shows a second NURBS curve 510 for a second incident ray 512. The same reflected ray 504 will generally have a different intersection point 516 with this surface. The family of NURBS surfaces and associated resampled BRDF data tables represent the four-dimensional BRDF function.

Just as reflected rays may be too sparsely sampled, or too irregularly sampled, so may incident rays. For more accurate interpolation, the measured BRDF data may also be resampled over a denser and/or more regular grid. FIG. 6 shows exemplary steps of a method 600 for resampling BRDF measurement data to provide BRDF values over a denser and/or more regular grid of incident rays. At an initial step, NURBS curves for an inverse BRDF function may be constructed by plotting BRDF values for different incident rays, for a fixed reflected ray. The BRDF function is inverted, only in the sense that the BRDF measurements are plotted as a function of the incident ray for a fixed reflected ray, instead of as a function of the reflected ray for a fixed incident ray. However, it is not an inverse function in a strict mathematical sense, and merely comprises a different representation of the same function. BRDF values for plotting may be taken from resampled BRDF data tables for the measured incident rays.

At step 604, a NURBS surface may be constructed from the NURBS curves plotted for a given outgoing ray, just as previously described for incident ray. The surface constructed in step 604 represents the BRDF function for a fixed reflected ray, as a function of the incident ray. NURBS surfaces may similarly be constructed for each reflected ray grid point in the resampled data tables.

At step 606, the incident-ray BRDF surface may be resampled over a denser and/or more regular grid of incident rays, to create a resampled data table for the "inverse" BRDF function. As indicated at step 608, the foregoing steps 602-606 should be repeated for each reflected ray having a grid point. The result is a family of BRDF values in tables, each table relating a BRDF value to a single reflected ray and a grid of incident rays. In combination, such tables represent the measured BRDF function resampled over different reflected-ray and incident-ray grids. They may be regarded as twice-resampled, being generated by resampling the first set of resampled BRDF data. Note that the size of the BRDF tables may grow with each resampling. For example, if a 100×100 grid may be used for measuring, a 100×1000 table may result from a first resampling of this data, and a 1000×1000 table may result from a second resampling.

If properly characterized in a relational database, such twice-resampled data tables may be used to determine estimated (resampled) BRDF values for any combination of the BRDF parameters $\theta_i$, $\phi_i$, $\theta_r$, $\phi_r$ in the grid. At step 610, a database relating each twice-resampled BRDF value in the data tables to the four parameters of the BRDF function may therefore be generated. The resampled BRDF data is now ready to be stored for use in any subsequent rendering. Once determined, it need never be recalculated.

During ray-tracing and rendering, the resampled data tables may simply be read and the BRDF value for a given reflected ray determined by selecting the BRDF value associated with the parameter values $\theta_i$, $\phi_i$, $\theta_r$, $\phi_r$ that most closely match a given incident and reflected ray. It is preferable, however, to interpolate between adjacent parameters to obtain a more accurate BRDF value. FIG. 7 shows exemplary steps for one suitable method 700 for interpolating resampled BRDF data during a shading process. In essence, method 700 comprises a conventional double interpolation. At step 702, the parameters $\theta_i$, $\phi_i$, $\theta_r$, $\phi_r$ are defined using any suitable ray-tracing method. Note that the orientation of the material to be rendered should be specified relative to the coordinate system used for ray-tracing, as well as the surface-normal vector. From this information, the incident and reflected ray parameters may be determined in the sample coordinate system.

At steps 704 and 706, the adjacent grid values of $\theta_i$, $\phi_i$, $\theta_r$, $\phi_r$ may be determined. If a quadrilinear interpolation is used, four corresponding grid points should be identified for each incident and reflected ray. For example, for each $\theta_i$, there are two adjacent values $\theta_1$, $\theta_2$ such that $\theta_1 > \theta_i > \theta_2$. Similarly, there are two adjacent $\phi$ values for each $\phi_i$. The four grid points for this incident ray would therefore be $\theta_1\phi_1$, $\theta_1\phi_2$, $\theta_2\phi_1$, $\theta_2\phi_2$.

At step 708, a first one of these grid points may be selected for the incident ray. At step 710, a BRDF value is interpolated from the resampled BRDF values for the four reflected ray grid points, corresponding to the first incident ray grid point. A fast linear interpolation should be sufficiently accurate, although other interpolation methods may be used, if desired. The next incident grid point is selected at step 712, and the interpolation step 710 is repeated for each incident grid point until an interpolated BRDF value has been determined for each incident grid point. For example, if four incident grid points are used, four interpolated BRDF values will be determined, one for each incident grid point. At step 714, a final BRDF result may then be interpolated from the first set of interpolated values. At step 716, the final result may be applied to determine the intensity of the reflected ray.

The methods of the invention may be performed using any suitable computer system. FIG. 8 shows a block diagram of a computer system 800, comprising a computer 802 connected to a memory 806 containing instructions for performing steps of the invention, and to a database 804 containing previously-defined data, such as resampled BRDF data or measurement data prior to resampling. Computer 802 may be configured to read a removable media 808, on which instructions for performing the steps of the invention may be encoded. Such instructions may be read and transferred to memory 806 for execution by computer 802. The instructions may be written in any suitable programming language and encoded for performing steps of a method according to the invention, as described above. Suitable computer systems and programming languages for processing measurement and image data are well known in the art.

Having thus described preferred embodiments of a system and method for rendering a digital object using BRDF data, it should be apparent to those skilled in the art that certain advantages of the within system have been achieved. In particular, it has been demonstrated that photo-realistic rendering results may be obtained using measured BRDF data, in the demanding production environment for a major motion picture. It should also be appreciated that various modifications, adaptations, and alternative embodiments thereof may be made within the scope and spirit of the present invention, as discussed above. For example, particular methods for resampling BRDF data have been described, but the invention would also apply to other methods for resampling BRDF data to provide a readily interpolated data table. BRDF measurement data for sample materials may also be gathered using other methods than described. The invention is defined by the appended claims.

What is claimed is:

1. A method for digitally rendering a material using BRDF data, the method comprising:

accessing a database of BRDF data, the BRDF data comprising measured BRDF values for a sample material;

processing the BRDF data to define estimated BRDF values over a regular grid corresponding to light rays, the light rays being of a type selected from incident rays or reflected rays; and recording the estimated BRDF values in a data table for input to a shading algorithm, whereby the shading algorithm is enabled to shade modeled surfaces of the material by interpolating BRDF values for modeled light rays from the estimated BRDF values in the data table corresponding to adjacent light rays, the adjacent light rays being of a type matching the modeled light rays.

2. The method of claim 1, wherein the processing step further comprises removing outliers from the BRDF data comprising measured BRDF values, prior to defining the estimated BRDF values.

3. The method of claim 1, wherein the processing step further comprises defining the estimated BRDF values over the regular grid of light rays, the light rays being reflected rays.

4. The method of claim 1, wherein the processing step further comprises defining the estimated BRDF values over the regular grid of light rays, the light rays being incident rays and reflected rays.

5. The method of claim 1, wherein the processing step further comprises constructing a NURBS surface from NURBS curves representing measured BRDF values along a defined section of a sampling grid.

6. The method of claim 5, wherein the processing step further comprises defining the estimated BRDF values for the light rays corresponding to the regular grid from intersections of the light rays with the NURBS surface.

7. The method of claim 1, further comprising measuring the measured BRDF values using a reflectometer with an incident light source comprising a laser.

8. The method of claim 7, wherein the measuring step further comprises emitting an incident beam configured as a beam of substantially constant cross-sectional area.

9. The method of claim 8, further comprising collecting the measured BRDF values for the incident beam corresponding to a regular grid of incident beam locations.

10. The method of claim 1, further comprising shading modeled surfaces of the material by interpolating BRDF values for modeled light rays from the estimated BRDF values in the data table using a fast quadrilinear interpolation.

11. A computer-readable media encoded with instructions for digitally rendering a material using BRDF data, the instructions comprising:

accessing a database of BRDF data, the BRDF data comprising measured BRDF values for a sample material;

processing the BRDF data to define estimated BRDF values over a regular grid corresponding to light rays, the light rays being of a type selected from incident rays or reflected rays; and recording the estimated BRDF values in a data table for input to a shading algorithm, whereby the shading algorithm is enabled to shade modeled surfaces of the material by interpolating BRDF values for modeled light rays from the estimated BRDF values in the data table corresponding to adjacent light rays, the adjacent light rays being of a type matching the modeled light rays.

12. The computer-readable media of claim 1, wherein the instructions for processing further comprise removing outliers from the BRDF data comprising measured BRDF values, prior to defining the estimated BRDF values.

13. The computer-readable media of claim 1, wherein the instructions for processing further comprise defining the estimated BRDF values over the regular grid of light rays, the light rays being reflected rays.

14. The computer-readable media of claim 1, wherein the instructions for processing further comprise defining the estimated BRDF values over the regular grid of light rays, the light rays being incident rays and reflected rays.

15. The computer-readable media of claim 1, wherein the instructions for processing further comprise constructing a NURBS surface from NURBS curves representing measured BRDF values along a defined section of a sampling grid.

16. The computer-readable media of claim 15, wherein the instructions for processing further comprise defining the estimated BRDF values for the light rays corresponding to the regular grid from intersections of the light rays with the NURBS surface.

17. The computer-readable media of claim 1, wherein the instructions further comprise shading modeled surfaces of the material by interpolating BRDF values for modeled light rays from the estimated BRDF values in the data table using a fast quadrilinear interpolation.

* * * * *